A. M. GOFF.
BODY CONSTRUCTION FOR CARS, WAGONS, &c.
APPLICATION FILED FEB. 20, 1920.
1,372,745.
Patented Mar. 29, 1921.
2 SHEETS—SHEET 1.
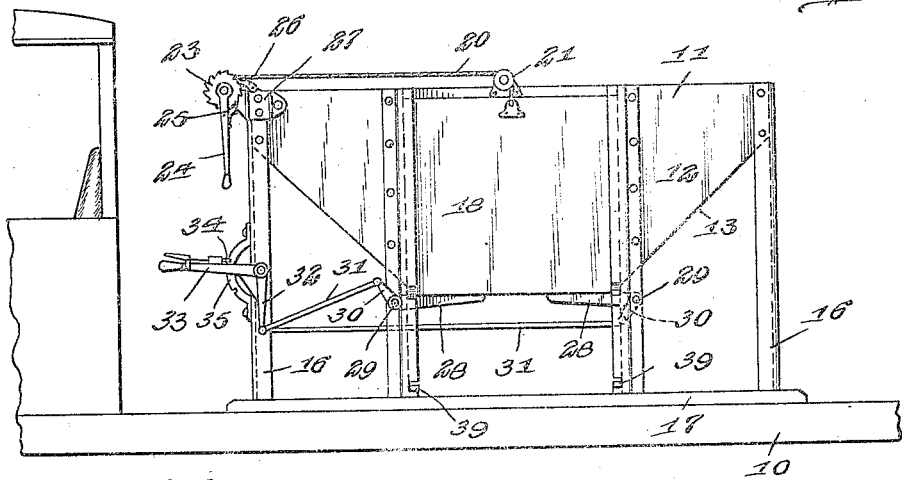
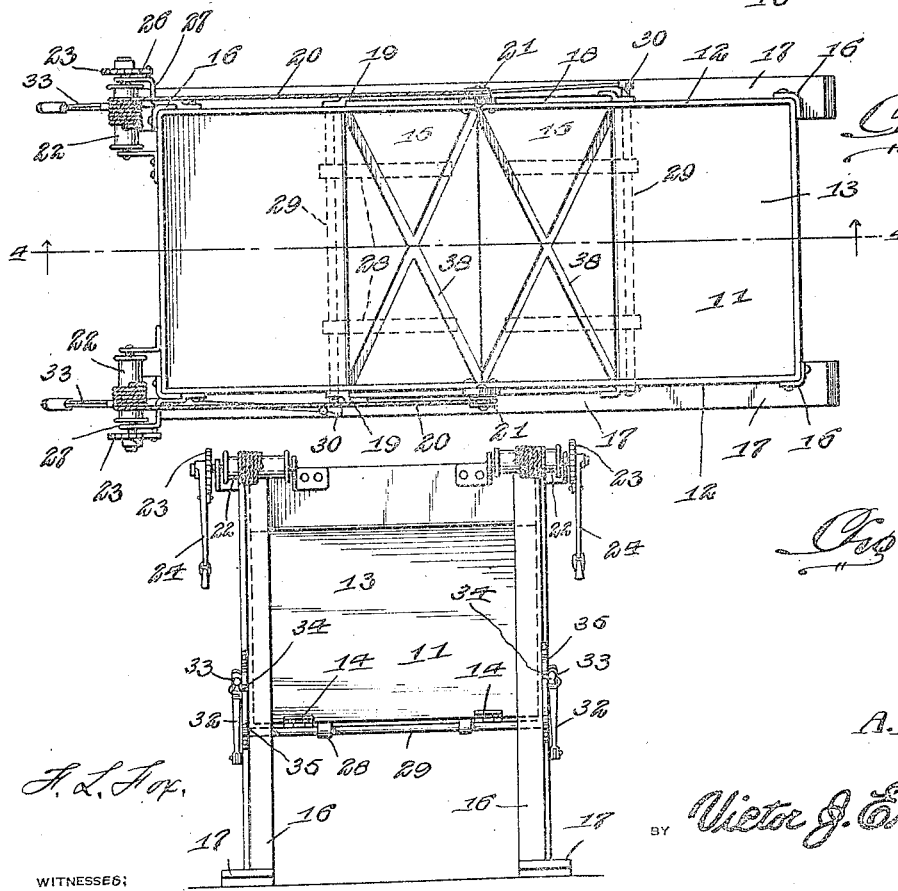
A. M. Goff.
INVENTOR
BY Victor J. Evans.
ATTORNEY
WITNESSES:

A. M. GOFF.
BODY CONSTRUCTION FOR CARS, WAGONS, &c.
APPLICATION FILED FEB. 20, 1920.
1,372,745.
Patented Mar. 29, 1921.
2 SHEETS—SHEET 2.
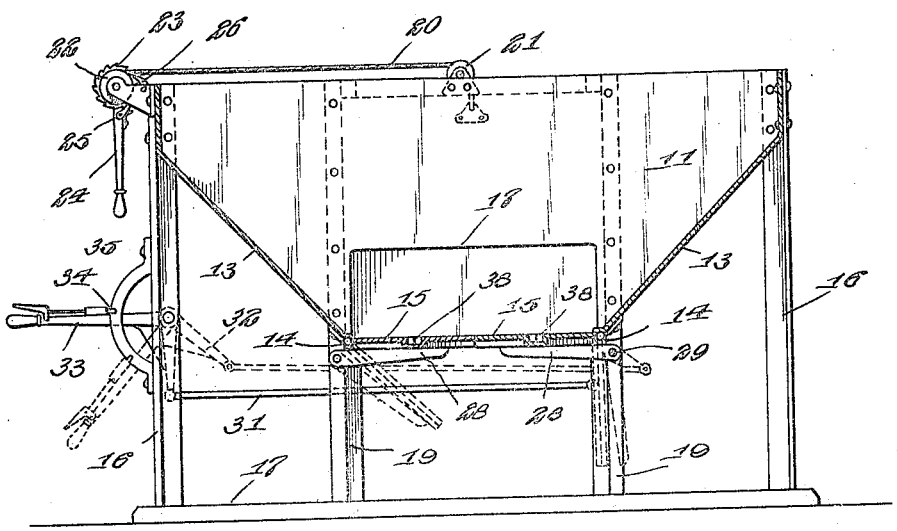
*Fig. 4.*
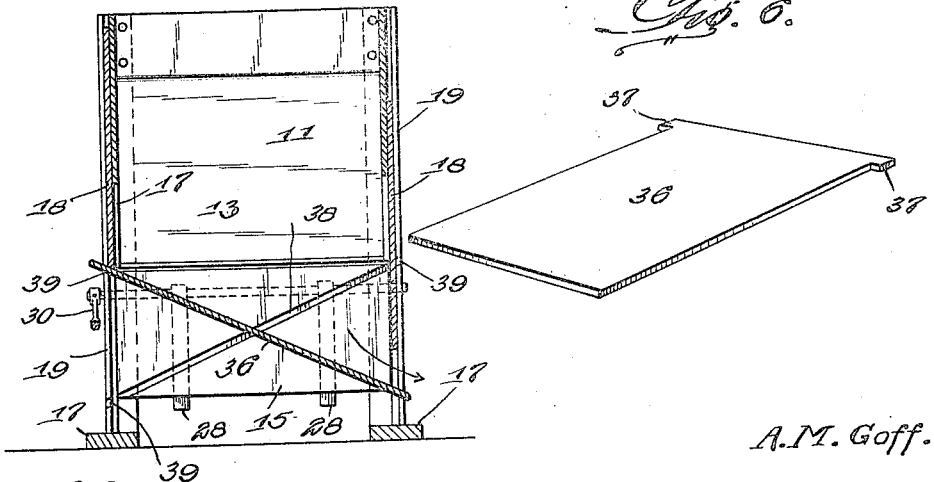
*Fig. 5.*
*Fig. 6.*
A. M. Goff.
INVENTOR
BY Victor J. Evans.
ATTORNEY
WITNESSES:

UNITED STATES PATENT OFFICE.

ANDREW M. GOFF, OF YOUNGSTOWN, OHIO.

BODY CONSTRUCTION FOR CARS, WAGONS, &c.

1,372,745.  Specification of Letters Patent.  Patented Mar. 29, 1921.

Application filed February 20, 1920. Serial No. 360,217.

*To all whom it may concern:*

Be it known that I, ANDREW M. GOFF, a citizen of the United States, residing at Youngstown, in the county of Mahoning and State of Ohio, have invented new and useful Improvements in Body Construction for Cars, Wagons, &c., of which the following is a specification.

This invention relates to vehicle body constructions and has for an object the provision of a body which is constructed as a unit and capable of being secured to a motor vehicle or wagon, railway car and the like.

Another object of the invention is the provision of a body of this character, which may be dumped from the bottom or either side, so that its contents may be deposited at the most convenient point.

A further object of the invention is the provision of a body of novel construction and in which the dumping means is easily controlled, to permit of the discharge of its contents as desired.

With the above and other objects in view, the invention further includes the following novel features and details of construction, to be hereinafter more fully described, illustrated in the accompanying drawings and pointed out in the claims hereunto appended.

In the drawings:

Figure 1 is a side elevation of the body constructed in accordance with the invention and shown in connection with a truck.

Fig. 2 is a top plan view of the body *per se.*

Fig. 3 is an end view of the same.

Fig. 4 is a central vertical longitudinal section showing by dotted lines the dumping positions of the bottom doors.

Fig. 5 is a central transverse sectional view illustrating the use of the removable bottom for discharging the contents of the body to one side.

Fig. 6 is a detail perspective view of the removable bottom.

Referring to the drawings in detail, wherein like characters of reference denote the corresponding parts, the invention is illustrated in connection with a truck, which may be either motor propelled or horse drawn, but as, before stated, it is equally adapted for use upon railway cars.

The portion of the truck illustrated, includes the side bars 10 of the frame and the truck body which is supported upon these side bars comprises a hopper 11. This hopper is formed of parallel side walls 12 and inclined end walls 13, the latter extending inwardly and downwardly and having hingedly secured to their lower edges as shown at 14, doors 15, the latter forming the bottom of the hopper.

The hopper is supported upon legs or standards 16, which are preferably formed of angle iron and have their lower ends secured to sills 17, which are bolted or otherwise secured to the side members 10 of the truck frame. One of the standards or legs 16 is secured to each corner of the hopper.

Formed in each of the side walls 12 adjacent the bottom thereof are discharge openings 17, the latter being controlled by closures in the form of slidably mounted gates 18. These gates operate in grooves formed by substantially Z-shaped standards 19 which are secured to each side of the hopper and extend downwardly below the same and are fastened to the sills 17 so as to provide additional supporting legs for the hopper.

Secured to the upper end of each of the gates 18, is one end of a chain or cable 20 which passes over a pulley 21 mounted upon the hopper and is wound upon a drum 22 mounted in suitable bearings at the forward end of the hopper. Each of the drums has secured thereto a ratchet wheel 23 and loosely mounted upon the drum shafts are operating handles 24. These handles carry spring actuated dogs 25 for engagement with the teeth of the ratchet wheel 23, so as to wind the rope or cable upon the drums. In order to prevent retrograde movement of the drums, the ratchet wheels 23 are engaged by gravity dogs 26, which are pivotally mounted upon brackets 27 which support the shafts of the drums 22.

The doors 15 are controlled by arms 28, the latter extending inwardly for contacting engagement with the lower surfaces of the doors and being rigidly secured to transversely arranged shafts 29, the latter being mounted in suitable bearings provided in the Z-shaped guides 19. Each of the shafts 29 has secured to one end (preferably opposite ends) an arm 30 and connected to each of these arms is a rod 31. These rods are in turn pivotally connected to arms 32, mounted for pivotal movement upon opposite sides of the hopper. Secured to the arms 32 are operating levers 33, the latter being provided with spring actuated detents 34 for engagement with segments 35, by means of which the levers are held in adjusted position. By this means the doors 15 may be independently operated and may be held in either a closed or partially or wholly open position as desired.

One of the novel features of the invention resides in the provision of a removable bottom for the hopper, the purpose being to provide an inclined bottom so that the contents of the hopper may be directed to either side. This removable bottom is indicated at 36 and comprises a substantially flat member having oppositely and outwardly extending lugs 37 at one end thereof. For the purpose of removably holding the bottom in position, each of the doors 15 are provided upon their upper faces with intersecting substantially X-shaped grooves 38, the latter being of sufficient width to receive the side edges of the bottom 36. When the doors 15 are wholly opened, that is, when they are disposed parallel, these grooves provide oppositely inclined and oppositely located guides for the reception of the bottom 36 as illustrated in Fig. 5 of the drawings, while the lugs 37 act as stops to limit the insertion of the bottom. For the purpose of providing a more rigid support for the bottom 36, each of the Z-shaped members 19 is provided with upper and lower oppositely located notches 39, which receive the side edges of the member 36. When the removable bottom is so arranged, a discharge chute is provided whose walls are defined by the removable bottom and the doors 15, the mouth of this chute being controlled by the closure 18, which is shown partly lowered in Fig. 5.

It will be seen from the foregoing description and accompanying drawings, that the invention provides a body which is constructed as a unit and capable of being secured upon a suitable transporting member and provided with means whereby its contents may be dumped directly through the bottom or to either side of the body as desired.

The invention is susceptible of various changes in its form, proportions and minor details of construction and the right is herein reserved to make such changes as properly fall within the scope of the appended claims.

Having described the invention what is claimed is:—

1. A vehicle body comprising a hopper having downwardly and inwardly inclined end walls, doors hingedly secured to the end walls and providing a bottom for the hopper, a shaft disposed transversely of the hopper in juxtaposition to the door hinges, arms secured to the shafts for contact with the doors to regulate the same and separate shaft operating means, whereby each of the doors may be independently operated.

2. A vehicle body comprising a hopper having downwardly and inwardly inclined end walls, doors hingedly secured to the end walls and providing a bottom for the hopper, means for operating the doors and a removable inclined bottom disposed transversely of the hopper for directing its contents to either side of the same.

3. A vehicle body comprising a hopper having downwardly and inwardly inclined end walls, doors hingedly secured to the end walls and providing a bottom for the hopper, means for operating the doors, a removable inclined bottom disposed transversely of the hopper for directing its contents to either side of the same and means carried by the doors for supporting the removable bottom.

4. A vehicle body comprising a hopper having downwardly and inwardly inclined end walls, doors hingedly secured to the end walls and providing a bottom for the hopper, means for operating the doors, a removable inclined bottom disposed transversely of the hopper for directing its contents to either side of the same and grooves formed in the upper face of each of the doors for receiving the removable bottom.

5. A vehicle body comprising a hopper having downwardly and inwardly inclined end walls, doors hingedly secured to the end walls and providing a bottom for the hopper, means for operating the doors, a removable inclined bottom disposed transversely of the hopper for directing its contents to either side of said hopper, means carried by the doors for supporting the removable bottom when the doors are in open position and whereby a discharge opening is formed whose walls are defined by the lower edge of the removable bottom and said doors and closures carried by the hopper for controlling the discharge opening.

In testimony whereof I affix my signature.

ANDREW M. GOFF.